United States Patent
Yanagawa et al.

(10) Patent No.: US 9,420,822 B2
(45) Date of Patent: Aug. 23, 2016

(54) EFFERVESCENT BEVERAGE PRODUCT AND METHOD RELATING TO SAME

(71) Applicant: SAPPORO BREWERIES LIMITED, Shibuya-ku (JP)

(72) Inventors: Koji Yanagawa, Shibuya-ku (JP); Hisaaki Sugiyama, Shibuya-ku (JP); Kazuhito Misaki, Shibuya-ku (JP); Yoshiaki Takei, Shibuya-ku (JP)

(73) Assignee: SAPPORO BREWERIES LIMITED, Shibuya-ku (JP)

( * ) Notice: Subject to any disclaimer, the term of this patent is extended or adjusted under 35 U.S.C. 154(b) by 0 days.

(21) Appl. No.: 14/383,340

(22) PCT Filed: Feb. 28, 2013

(86) PCT No.: PCT/JP2013/055375
§ 371 (c)(1),
(2) Date: Sep. 5, 2014

(87) PCT Pub. No.: WO2013/133119
PCT Pub. Date: Sep. 12, 2013

(65) Prior Publication Data
US 2015/0030747 A1  Jan. 29, 2015

(30) Foreign Application Priority Data
Mar. 5, 2012 (JP) ................... 2012-048568

(51) Int. Cl.
*A23L 2/54* (2006.01)
*C12C 11/11* (2006.01)

(52) U.S. Cl.
CPC .................. *A23L 2/54* (2013.01); *C12C 11/11* (2013.01); *A23V 2002/00* (2013.01)

(58) Field of Classification Search
CPC .............. A23L 2/54; A23V 2200/226; A23V 2250/10; A23V 2250/11; A23V 2002/00; C12C 11/11
USPC ........................................ 426/590, 592, 477
See application file for complete search history.

(56) References Cited

U.S. PATENT DOCUMENTS

| 4,832,968 A | 5/1989 | Forage et al. |
| 5,620,725 A * | 4/1997 | Jamieson ............... B65D 85/73 206/222 |

(Continued)

FOREIGN PATENT DOCUMENTS

| JP | 61-173771 A | 8/1986 |
| JP | 62-135156 A | 6/1987 |

(Continued)

OTHER PUBLICATIONS

International Preliminary Report on Patentability and Written Opinion issued Sep. 18, 2014, in International Application No. PCT/JP2013/055375.

(Continued)

*Primary Examiner* — Helen F Heggestad
(74) *Attorney, Agent, or Firm* — Oblon, McClelland, Maier & Neustadt, L.L.P.

(57) ABSTRACT

Provided are a sparkling beverage product exhibiting excellent foam properties, and a method related thereto. A sparkling beverage product according to the present invention includes: a sparkling beverage; and a container for holding the sparkling beverage, in which: an empty portion inside the container is filled with carbon dioxide gas and nitrogen gas so that the following condition (a) or (b) is satisfied: (a) a pressure of the carbon dioxide gas is 200 kPa or more, and a ratio of a pressure of the nitrogen gas to the pressure of the carbon dioxide gas is 0.5 or more; or (b) a pressure of the carbon dioxide gas is 170 kPa or more and less than 200 kPa, and a ratio of a pressure of the nitrogen gas to the pressure of the carbon dioxide gas is 1.0 or more.

11 Claims, 1 Drawing Sheet

| | GAS PRESSURE OF EMPTY PART | | | FOAM PROPERTIES | |
|---|---|---|---|---|---|
| | PRESSURE OF CARBON DIOXIDE GAS (kPa) | PRESSURE OF NITROGEN GAS (kPa) | $N_2/CO_2$ RATIO | SURGING | STATE OF FOAM |
| EXAMPLE 1 | 178 | 263 | 1.48 | ○ | ○ |
| EXAMPLE 2 | 180 | 325 | 1.81 | ◎ | ○ |
| EXAMPLE 3 | 185 | 181 | 0.98 | × | △ |
| EXAMPLE 4 | 186 | 208 | 1.12 | △ | △ |
| EXAMPLE 5 | 208 | 280 | 1.35 | ◎ | ○ |
| EXAMPLE 6 | 222 | 138 | 0.62 | ○ | ○ |
| EXAMPLE 7 | 223 | 293 | 1.31 | ◎ | ○ |
| EXAMPLE 8 | 239 | 135 | 0.56 | ○ | △ |
| EXAMPLE 9 | 246 | 197 | 0.80 | ◎ | ○ |
| EXAMPLE 10 | 248 | 138 | 0.56 | ○ | ○ |
| EXAMPLE 11 | 250 | 271 | 1.08 | ◎ | ○ |

(56) References Cited

U.S. PATENT DOCUMENTS

2002/0197364 A1 12/2002 Shyong Pan
2006/0016511 A1* 1/2006 Chantalat .................. A23L 2/54
 141/64
2013/0340497 A1* 12/2013 Tata .................. G01N 33/0006
 73/1.06

FOREIGN PATENT DOCUMENTS

| JP | 2001-509456 A | 7/2001 |
| JP | 2002-527095 A | 8/2002 |
| JP | 2006-335413 A | 12/2006 |
| WO | 99/02406 A1 | 1/1999 |
| WO | 00/23357 A1 | 4/2000 |
| WO | 2008/000271 A2 | 1/2008 |

OTHER PUBLICATIONS

International Search Report issued May 21, 2013 in PCT/JP2013/055375 filed Feb. 28, 2013.

Office Action issued Jun. 17, 2014 in Japanese Patent Application No. 2012-048568.

Toshiro Washizaki, et al, "Under Cover Gassing ni yoru Kosoku Datsusanso Chikan no Kaiseki" The Canners Journal, vol. 88, No. 10, Oct. 1, 2009, pp. 34-35, 120.

Tsuneo Kita, "Chisso Gas no Beer eno Riyo" Onko Chishin, No. 37, Jul. 21, 2000, pp. 67-80, 98.

N.J. Hepworth, et al., "Characterizing Gas Bubble Dispersions in Beer" Trans IChemE, [Food Bioprod. Process], vol. 79, No. C1, Mar. 2001, pp. 13-20.

* cited by examiner

|  | GAS PRESSURE OF EMPTY PART ||| FOAM PROPERTIES ||
|  | PRESSURE OF CARBON DIOXIDE GAS (kPa) | PRESSURE OF NITROGEN GAS (kPa) | $N_2/CO_2$ RATIO | SURGING | STATE OF FOAM |
| --- | --- | --- | --- | --- | --- |
| EXAMPLE 1 | 178 | 263 | 1.48 | ○ | ○ |
| EXAMPLE 2 | 180 | 325 | 1.81 | ◎ | ○ |
| EXAMPLE 3 | 185 | 181 | 0.98 | × | △ |
| EXAMPLE 4 | 186 | 208 | 1.12 | △ | △ |
| EXAMPLE 5 | 208 | 280 | 1.35 | ◎ | ○ |
| EXAMPLE 6 | 222 | 138 | 0.62 | ○ | ○ |
| EXAMPLE 7 | 223 | 293 | 1.31 | ◎ | ○ |
| EXAMPLE 8 | 239 | 135 | 0.56 | ○ | △ |
| EXAMPLE 9 | 246 | 197 | 0.80 | ◎ | ○ |
| EXAMPLE 10 | 248 | 138 | 0.56 | ○ | ○ |
| EXAMPLE 11 | 250 | 271 | 1.08 | ◎ | ○ |

EFFERVESCENT BEVERAGE PRODUCT AND METHOD RELATING TO SAME

CROSS REFERENCE TO RELATED APPLICATIONS

The present application is a 35 U.S.C. §371 national stage patent application of International patent application PCT/JP2013/055375, filed on Feb. 28, 2013, published as WO/2013/133119 on Sep. 12, 2013, the text of which is incorporated by reference, and claims the benefit of the filing date of Japanese application no. 2012-048568, filed on Mar. 5, 2012, the text of which is also incorporated by reference.

TECHNICAL FIELD

The present invention relates to a sparkling beverage product and a method related thereto, and more particularly, to an improvement of foam properties.

BACKGROUND ART

Hitherto, for example, Patent Literature 1 discloses that preferred foam of a sparkling beverage can be obtained when a hollow body (so-called widget) in which nitrogen gas of atmospheric pressure or of a pressure higher than atmospheric pressure is encapsulated in advance is injected into a can of the sparkling beverage such as beer.

CITATION LIST

Patent Literature

[Patent Literature 1] JPS62-135156 A

SUMMARY OF INVENTION

Technical Problem

However, beer poured from a can provided with the widget is not always sufficient in foam-forming property, although the beer is excellent in foam-stability. That is, heretofore, it has not been easy to accomplish foam properties including excellent foam-forming property and foam-stability.

In addition, heretofore, it has been difficult to accomplish excellent foam properties without using a special gas-holding device such as the widget or a special dispensing device such as a server.

The present invention has been made in view of these problems, and one of the objects of the present invention is to provide a sparkling beverage product accomplishing excellent foam properties without using a special device, and a method related thereto.

Solution to Problem

A sparkling beverage product according to one embodiment of the present invention for achieving the above-mentioned object includes: a sparkling beverage; and a container for holding the sparkling beverage, in which: an empty portion inside the container is filled with carbon dioxide gas and nitrogen gas so that the following condition (a) or (b) is satisfied: (a) a pressure of the carbon dioxide gas is 200 kPa or more, and a ratio of a pressure of the nitrogen gas to the pressure of the carbon dioxide gas is 0.5 or more; or (b) a pressure of the carbon dioxide gas is 170 kPa or more and less than 200 kPa, and a ratio of a pressure of the nitrogen gas to the pressure of the carbon dioxide gas is 1.0 or more. According to the one embodiment of the present invention, there is provided a sparkling beverage product capable of accomplishing excellent foam properties without using a special device.

In addition, the empty portion inside the container may be filled with the carbon dioxide gas and the nitrogen gas so that the condition (a) is satisfied. In addition, the empty portion inside the container may be filled with the carbon dioxide gas and the nitrogen gas so that the condition (b) is satisfied. In addition, the container may have a volume of 1 L or less.

A method according to one embodiment of the present invention for achieving the above-mentioned object is a method of manufacturing a sparkling beverage product including a sparkling beverage and a container for holding the sparkling beverage, the method including filling an empty portion inside the container with carbon dioxide gas and nitrogen gas so that the following condition (a) or (b) is satisfied: (a) a pressure of the carbon dioxide gas is 200 kPa or more, and a ratio of a pressure of the nitrogen gas to the pressure of the carbon dioxide gas is 0.5 or more; or (b) a pressure of the carbon dioxide gas is 170 kPa or more and less than 200 kPa, and a ratio of a pressure of the nitrogen gas to the pressure of the carbon dioxide gas is 1.0 or more. According to the one embodiment of the present invention, there is provided a method of manufacturing a sparkling beverage product capable of accomplishing excellent foam properties without using a special device.

A method according to one embodiment of the present invention for achieving the above-mentioned object is a method, including, in a sparkling beverage product including a sparkling beverage and a container for holding the sparkling beverage, filling an empty portion inside the container with carbon dioxide gas and nitrogen gas so that the following condition (a) or (b) is satisfied to improve foam properties of the sparkling beverage: (a) a pressure of the carbon dioxide gas is 200 kPa or more, and a ratio of a pressure of the nitrogen gas to the pressure of the carbon dioxide gas is 0.5 or more; or (b) a pressure of the carbon dioxide gas is 170 kPa or more and less than 200 kPa, and a ratio of a pressure of the nitrogen gas to the pressure of the carbon dioxide gas is 1.0 or more. According to the one embodiment of the present invention, there is provided a method of efficiently enhancing foam properties of a sparkling beverage product without using a special device.

Advantageous Effects of Invention

According to one embodiment of the present invention, the sparkling beverage product accomplishing excellent foam properties without using a special device, and the method related thereto are provided.

BRIEF DESCRIPTION OF DRAWING

FIG. 1 is an explanatory diagram showing examples of evaluation results of foam properties of sparkling beverage products in Examples according to one embodiment of the present invention.

DESCRIPTION OF EMBODIMENTS

Hereinafter, embodiments of the present invention are described. It should be noted that the present invention is not limited to these embodiments.

A sparkling beverage product according to one embodiment of the present invention (hereinafter referred to as "product of the present invention") includes a sparkling beverage and a container for holding the sparkling beverage. That is, the product of the present invention is a product of a sparkling beverage in a container.

The sparkling beverage is a beverage having foam properties including foam-forming property and foam-stability. That is, the sparkling beverage is, for example, a beverage containing carbon dioxide gas, which has foam-forming property for forming a foam layer on the top of a liquid surface when poured in a drinking container such as a glass and foam-stability for holding the foam for at least a certain period of time.

The sparkling beverage may be a sparkling alcoholic beverage. The sparkling alcoholic beverage is a sparkling beverage having an ethanol content of 1 vol % or more. The ethanol content of the sparkling alcoholic beverage may be from 1 to 20 vol %, for example.

The sparkling beverage may be a sparkling non-alcoholic beverage. The sparkling non-alcoholic beverage is a sparkling beverage having an ethanol content of less than 1 vol %. The ethanol content of the sparkling non-alcoholic beverage may be less than 0.005 vol %, for example.

The sparkling beverage may be one produced using a plant raw material. The plant raw material is not particularly limited as long as the material is used for producing a beverage, and may be, for example, one or more kinds selected from the group consisting of grain, beans, and potatoes and/or a product obtained by allowing one or more kinds selected from the group to germinate.

The grain may be, for example, one or more kinds selected from the group consisting of barley, wheat, rice, and corn. That is, the plant raw material may be, for example, one or more kinds selected from the group consisting of barley, wheat, rice, corn, beans, and potatoes and/or a product obtained by allowing one or more kinds selected from the group to germinate.

Specifically, the sparkling beverage may be, for example, one produced using barley malt and/or wheat malt. In addition, the sparkling beverage may be, for example, one produced using another plant raw material without using the barley malt and the wheat malt.

The container of the product of the present invention is not particularly limited as long as the container holds a sparkling beverage, and for example, a can, a bottle, or a barrel may preferably be used. It should be noted that the empty portion inside the container to be described below is a headspace of the container. That is, for example, in the product of the present invention that is left to stand still, the empty portion is a space formed between the liquid surface of the sparkling beverage in the container and the inner surface of the container.

The material that constitutes the container is not particularly limited, and there may be used, for example, one or more kinds selected from the group consisting of metals, inorganic materials (such as glass and ceramics), and organic materials (such as resins and paper). That is, the container may be, for example, a can made from a metal (for example, aluminum or steel), a bottle made from glass or a bottle made from a resin (for example, a bottle made from polyethylene terephthalate (PET): PET bottle), or a barrel made from a metal (for example, aluminum or steel) or a barrel made from a resin.

The volume of the container is not particularly limited, and may be 1 L or less, for example. That is, the container may be, for example, a can having a volume of 1 L or less, a bottle having a volume of 1 L or less, or a barrel having a volume of 1 L or less. It should be noted that the lower limit of the volume of the container is not particularly limited, and the volume may be 100 mL or more, for example.

In a case where the container has a relatively small volume as described above, excellent foam properties of the sparkling beverage are accomplished simply by directly pouring the beverage from the container into a drinking container such as a glass without using a special dispensing device such as a server.

In addition, one of the features of the product of the present invention is that an empty portion inside the container is filled with carbon dioxide gas and nitrogen gas so that the following condition (a) or (b) is satisfied: (a) a pressure of the carbon dioxide gas is 200 kPa or more, and a ratio of a pressure of the nitrogen gas to the pressure of the carbon dioxide gas is 0.5 or more; or (b) a pressure of the carbon dioxide gas is 170 kPa or more and less than 200 kPa, and a ratio of a pressure of the nitrogen gas to the pressure of the carbon dioxide gas is 1.0 or more.

That is, with regard to the condition (a), in the product of the present invention, excellent foam properties of the sparkling beverage are accomplished by adjusting the pressure of the carbon dioxide gas to 200 kPa or more and by allowing the nitrogen gas to coexist so that the ratio of the pressure of the nitrogen gas to the pressure of the carbon dioxide gas (hereinafter referred to as "$N_2/CO_2$ ratio") is 0.5 or more, in the empty portion inside the container.

In this case, the $N_2/CO_2$ ratio may be 0.6 or more, or 0.7 or more. In addition, the $N_2/CO_2$ ratio is preferably 0.8 or more. That is, particularly excellent foam properties are accomplished by adjusting the pressure of the carbon dioxide gas to 200 kPa or more and by allowing the nitrogen gas to coexist so that the $N_2/CO_2$ ratio is 0.8 or more, in the empty portion of the product of the present invention. Further, the $N_2/CO_2$ ratio may be 1.0 or more, more than 1.0, 1.1 or more, 1.2 or more, or 1.3 or more. When the pressure of the carbon dioxide gas in the empty portion is 200 kPa or more, the upper limit of the $N_2/CO_2$ ratio is not particularly limited, and the $N_2/CO_2$ ratio may be 2.0 or less, for example.

In addition, with regard to the condition (b), in the product of the present invention, excellent foam properties of the sparkling beverage are accomplished by adjusting the pressure of the carbon dioxide gas to 170 kPa or more and less than 200 kPa and by allowing the nitrogen gas to coexist so that the $N_2/CO_2$ ratio is 1.0 or more, in the empty portion inside the container.

In this case, the $N_2/CO_2$ ratio is preferably 1.1 or more, more preferably 1.2 or more. When the pressure of the carbon dioxide gas in the empty portion is 170 kPa or more and less than 200 kPa, the upper limit of the $N_2/CO_2$ ratio is not particularly limited, and the $N_2/CO_2$ ratio may be 3.50 or less, for example.

The mixed gas in the empty portion is not particularly limited as long as the gas includes carbon dioxide gas and nitrogen gas and satisfies the condition (a) or (b). For example, in the empty portion, the ratio of the total of the pressure of the carbon dioxide gas and the pressure of the nitrogen gas to the pressure of the mixed gas (internal pressure of the empty portion, total pressure) may be 90% or more (from 90 to 100%) or 95% or more (from 95 to 1000).

Such a product of the present invention accomplishes excellent foam properties of a sparkling beverage in a drinking container simply by, for example, directly pouring the sparkling beverage from the container into the drinking container such as a glass without providing a gas-holding device such as a widget in the container.

In addition, for example, when the container of the product of the present invention has a volume of 1 L or less, a consumer accomplishes excellent foam properties of a sparkling beverage simply by directly pouring the sparkling beverage from the container into a drinking container such as a glass using their hand, without using a dispensing device such as a server.

A method according to one embodiment of the present invention (hereinafter referred to as "method of the present invention") is, for example, a method of manufacturing a sparkling beverage product including a sparkling beverage and a container for holding the sparkling beverage, the method including filling an empty portion inside the container with carbon dioxide gas and nitrogen gas so that the following condition (a) or (b) is satisfied: (a) a pressure of the carbon dioxide gas is 200 kPa or more, and a ratio of a pressure of the nitrogen gas to the pressure of the carbon dioxide gas is 0.5 or more; or (b) a pressure of the carbon dioxide gas is 170 kPa or more and less than 200 kPa, and a ratio of a pressure of the nitrogen gas to the pressure of the carbon dioxide gas is 1.0 or more. The product of the present invention as described above is preferably produced by the method of the present invention.

In the method of the present invention, the timing and method of filling the empty portion inside the container with the carbon dioxide gas and the nitrogen gas are not particularly limited. That is, for example, the filling with the carbon dioxide gas and the nitrogen gas may be performed before the filling of the container with the sparkling beverage or after the filling of the container with the sparkling beverage. In addition, for example, the carbon dioxide gas and the nitrogen gas may be dissolved in advance in the sparkling beverage before the step of filling the container with the sparkling beverage, or may be dissolved in the sparkling beverage in the filling step. More specifically, the container may be filled with the carbon dioxide gas and the nitrogen gas by the following method.

That is, in a case where the container is a can, the method involves: for example, firstly blowing the carbon dioxide gas, the nitrogen gas, or a mixed gas of the carbon dioxide gas and the nitrogen gas into the can to remove air and to increase a pressure in the can; subsequently filling the can with the sparkling beverage; and finally sealing the can.

In a case where the container is a bottle, the method involves: for example, firstly vacuuming out the air in the bottle using a decompression device such as a vacuum pump; subsequently blowing the carbon dioxide gas, the nitrogen gas, or the mixed gas of the carbon dioxide gas and the nitrogen gas into the bottle to increase a pressure in the bottle; and then filling the bottle with the sparkling beverage.

In a case where the container is a barrel, the method involves: for example, firstly blowing the nitrogen gas or a mixed gas of the carbon dioxide gas and the nitrogen gas into the barrel to remove air and to increase a pressure in the barrel; and subsequently filling the barrel with the sparkling beverage.

The method of filling with the nitrogen gas is not particularly limited, and there may be employed, for example, addition of liquid nitrogen by drops and/or blowing of the nitrogen gas, where the addition of liquid nitrogen by drops is preferably employed. The liquid nitrogen has a very small volume compared to the nitrogen gas, and hence efficiently increases the pressure of the nitrogen gas in the container.

According to the method of the present invention, a sparkling beverage product exhibiting excellent foam properties is efficiently produced by filling the empty portion inside the container with the carbon dioxide gas and the nitrogen gas so that the condition (a) or (b) is satisfied.

In addition, the method of the present invention is, for example, a method comprising, in a sparkling beverage product including a sparkling beverage and a container for holding the sparkling beverage, filling an empty portion inside the container with carbon dioxide gas and nitrogen gas so that the following condition (a) or (b) is satisfied to improve foam properties of the sparkling beverage: (a) a pressure of the carbon dioxide gas is 200 kPa or more, and a ratio of a pressure of the nitrogen gas to the pressure of the carbon dioxide gas is 0.5 or more; or (b) a pressure of the carbon dioxide gas is 170 kPa or more and less than 200 kPa, and a ratio of a pressure of the nitrogen gas to the pressure of the carbon dioxide gas is 1.0 or more.

According to the method of the present invention, the foam properties of the sparkling beverage product are efficiently improved by filling the empty portion inside the container with the carbon dioxide gas and the nitrogen gas so that the condition (a) or (b) is satisfied.

That is, in the method of the present invention, the foam properties of the sparkling beverage are efficiently improved by, for example, filling the empty portion inside the container of the sparkling beverage product with the carbon dioxide gas and the nitrogen gas so that the following condition is satisfied: the pressure of the carbon dioxide gas is 200 kPa or more; and the ratio of the pressure of the nitrogen gas to the pressure of the carbon dioxide gas is 0.5 or more, compared to a case where the condition is not satisfied.

In addition, in the method of the present invention, the foam properties of the sparkling beverage are efficiently improved by, for example, filling the empty portion inside the container of the sparkling beverage product with the carbon dioxide gas and the nitrogen gas so that the following condition is satisfied: the pressure of the carbon dioxide gas is 170 kPa or more and less than 200 kPa; and the ratio of the pressure of the nitrogen gas to the pressure of the carbon dioxide gas is 1.0 or more, compared to a case where the condition is not satisfied.

The improvement of the foam properties by the method of the present invention is, for example, an improvement of one or more foam properties selected from the group consisting of fineness of foam to be formed, foam-forming property, and foam-stability.

The improvement of the fineness of foam is, for example, a reduction in bubble diameter of foam to be formed on a liquid surface of the sparkling beverage. The improvement of the foam-forming property is, for example, an increase in thickness of foam to be formed on a liquid surface of the sparkling beverage. The improvement of the foam-stability is, for example, suppression of a decrease in thickness of foam formed on a liquid surface of the sparkling beverage within a predetermined time period. The improvement of the foam-stability is evaluated by, for example, an increase in NIBEM value.

Hereinafter, specific examples according to those embodiments are described.

EXAMPLES

[Production of Sparkling Beverage Product]

A beer was produced by preparing a pre-fermentation solution (so-called wort) using raw materials including malt and hops and adding beer yeast to the pre-fermentation solution to perform alcoholic fermentation.

Subsequently, an aluminum can was filled with 350 mL of the beer, and the empty portion (volume: about 21 mL) inside the can was filled with carbon dioxide gas and nitrogen gas so that a predetermined condition was satisfied.

That is, firstly, carbon dioxide gas was substituted for air in the can, secondly, the can was filled with the beer, thereafter, liquid nitrogen was added by drops to the empty portion inside the can, and finally, the can was sealed.

Thus, there were produced 11 kinds of sparkling beverage products each having a beer and a can for holding the beer, in which the empty portion inside the can was filled with carbon dioxide gas and nitrogen gas so that a predetermined condition was satisfied.

[Measurement of Pressure of Carbon Dioxide Gas and Pressure of Nitrogen Gas]

A commercially available dissolved nitrogen/carbon dioxide gas analyzer (model 511 series, manufactured by Hack-Ultra Co., Ltd.) was used to measure the pressure of the carbon dioxide gas and the pressure of the nitrogen gas in the empty portion inside the can of each of the sparkling beverage products.

The analyzer included a detector for carbon dioxide gas and a detector for nitrogen gas each including a thermal conductivity detector (TCD) element.

Specifically, the pressure of the carbon dioxide gas and the pressure of the nitrogen gas in the empty portion inside the can of the sparkling beverage product were measured at 20° C. by inserting, into the empty portion, a needle-like sampling portion connected to the detector for carbon dioxide gas and the detector for nitrogen gas in the analyzer. The measurement with the detector for carbon dioxide gas was performed in a range of from 0 to 10 bar, and the measurement with the detector for nitrogen gas was performed in a range of from 0 to 350 ppm.

A value (bar) measured with the detector for carbon dioxide gas and a value (ppm) measured with the detector for nitrogen gas were separately converted into. Pa-scale values (absolute pressures)

[Evaluation of Foam Properties]

A pull-tab of 350 mL can of a sparkling beverage product was opened to form an opening, and about 350 mL of a beer in the can was poured from the opening into a tumbler having a volume of about 420 mL over 10 seconds. Then, 15 panelists observed the state of the beer in the tumbler.

That is, firstly, the panel evaluated occurrence of surging in the beer in the tumbler. In general, when surging occurs in a state in which a liquid and a gas remain under foam formed in the vicinity of the liquid surface of the sparkling beverage by pouring a sparkling beverage such as beer into a container such as a tumbler, properties of the foam of the sparkling beverage are improved. Therefore, the occurrence of surging serves as an indicator of excellent foam properties of a sparkling beverage poured in a container.

In addition, the state of the foam formed in the vicinity of the liquid surface of the beer in the tumbler was comprehensively evaluated. That is, fineness of the foam (sensory test), foam-forming (the thickness of the foam 1 minute and 2 minutes after pouring the beer into the tumbler), and foam-stability (the thickness of the foam immediately just after, and 1 minute, and 2 minutes after pouring the beer into the tumbler) were comprehensively evaluated.

RESULTS

FIG. 1 shows the gas pressures in the empty portions inside the cans of the 11 kinds of sparkling beverage products (Examples 1 to 11) and the results of evaluation of foam properties of the beers poured into the tumblers. That is, FIG. 1 shows $N_2/CO_2$ ratios calculated based on the pressures (kPa) of carbon dioxide gas and the pressures (kPa) of nitrogen gas in the empty portions and the results of evaluation of surging and foam states in the beers poured in the tumblers.

In the column of "Surging", a "cross" symbol indicates that little surging occurred, a "triangle" symbol indicates that a little surging occurred, a "single circle" symbol indicates that surging occurred, and a "double circle" symbol indicates that surging occurred sufficiently. It should be noted that the evaluation of surging was performed by comprehensively evaluating "sensory evaluation" and "foam thickness measured 1 minute after pouring a beer into a tumbler". In addition, in the column of "State of foam", a "triangle" symbol indicates that the beverage had no problem with foam properties required for beer, and a "single circle" symbol indicates that the beverage was excellent in foam properties required for beer. It should be noted that a "cross" symbol indicating that the foam was insufficient as foam required for beer was defined, but there was no example evaluated as a "cross" symbol.

As shown in FIG. 1, in Examples 1 to 4, the pressures of the carbon dioxide gas were found to be 170 kPa or more and less than 200 kPa. Further, in Example 3, the product was found to have an $N_2/CO_2$ ratio of 0.98 and was evaluated with respect to surging as a "cross" symbol and on the state of foam as a "triangle" symbol.

On the other hand, in Example 4, the product was found to have an $N_2/CO_2$ ratio of 1.12 and was evaluated for surging as a "triangle" symbol and for the state of foam as a "triangle" symbol. In addition, in Example 1, the product was found to have an $N_2/CO_2$ ratio of 1.48 and was evaluated for surging as a "single circle" symbol and for the state of foam as a "single circle" symbol. Further, in Example 2, the product was found to have an $N_2/CO_2$ ratio of 1.81 and was evaluated for surging as a "double circle" symbol and for the state of foam as a "single circle" symbol.

In addition, as shown in FIG. 1, in Examples 5 to 11, the pressures of the carbon dioxide gas were found to be 200 kPa or more, and the products were found to have $N_2/CO_2$ ratios of 0.5 or more. Further, in Examples 6, 8, and 10, the products were found to have $N_2/CO_2$ ratios of from 0.56 to 0.62 and were evaluated for surging as a "single circle" symbol and for the state of foam as a "triangle" symbol or a "single circle" symbol. In addition, in Examples 5, 7, 9, and 11, the products were found to have $N_2/CO_2$ ratios of from 0.80 to 1.35 and were evaluated for surging as a "double circle" symbol and for the state of foam as a "single circle" symbol. Further, although not shown in FIG. 1, the products were evaluated on "Sensory evaluation" of the surging as a "triangle" symbol in Example 9, as a "single circle" symbol in Example 11, and as a "double circle" symbol in Examples 5 and 7. That is, the product of Example 11 was evaluated to be more preferred than that of Example 9, and the products of Examples 5 and 7 were evaluated to be even more preferred than that of Example 11.

The invention claimed is:

1. A sparkling beverage product, comprising:
   a container containing a sparkling beverage comprising a barley malt component, a wheat malt component or a mixture of these; and an empty portion inside the container comprises carbon dioxide gas and nitrogen gas so that (a) or (b) is satisfied:
   (a) a pressure of the carbon dioxide gas is 200 kPa or more, and a ratio of a pressure of the nitrogen gas to the pressure of the carbon dioxide gas is 0.8 to 2.0; or (b) a pressure of the carbon dioxide gas is 170 kPa or more and less than 200 kPa, and a ratio of a pressure of the nitrogen gas to the pressure of the carbon dioxide gas is 1.2 to 3.5.

2. The sparkling beverage product according to claim 1, wherein the condition (a) is satisfied.

3. The sparkling beverage product according to claim 2, wherein the container has a volume of 1 L or less.

4. The sparkling beverage product according to claim 1, wherein condition (b) is satisfied.

5. The sparkling beverage product according to claim 4, wherein the container has a volume of 1 L or less.

6. The sparkling beverage product according to claim 1, wherein the container has a volume of 1 L or less.

7. The sparkling beverage product according to claim 1, which does not comprise a gas-holding device.

8. A method of manufacturing a sparkling beverage product comprising a sparkling beverage and a container containing the sparkling beverage,
the method comprising
filling the container with a sparkling beverage and carbon dioxide gas and nitrogen gas, wherein the carbon dioxide and nitrogen gas are present in an empty portion inside the container not comprising the sparkling beverage, wherein the carbon dioxide and nitrogen gas are provided so that condition (a) or (b) is satisfied:
(a) a pressure of the carbon dioxide gas is 200 kPa or more, and a ratio of a pressure of the nitrogen gas to the pressure of the carbon dioxide gas is 0.8 to 2.0; or
(b) a pressure of the carbon dioxide gas is 170 kPa or more and less than 200 kPa, and a ratio of a pressure of the nitrogen gas to the pressure of the carbon dioxide gas is 1.2 to 3.5,
wherein the method does not comprise a gas-holding device, and
wherein the sparkling beverage comprises a barley malt component, a wheat malt component or a mixture of these.

9. The method according to claim 8, wherein the filling with the sparkling beverage is before the filling with carbon dioxide and nitrogen gas.

10. The method according to claim 8, wherein the filling with the sparkling beverage is after filling with carbon dioxide and nitrogen gas.

11. A method of improving foam properties of a sparkling beverage in a container, the method comprising, filling, before or after the container is filled with the sparkling beverage, an empty portion inside the container with carbon dioxide gas and nitrogen gas so that condition (a) or (b) is satisfied:
(a) a pressure of the carbon dioxide gas is 200 kPa or more, and a ratio of a pressure of the nitrogen gas to the pressure of the carbon dioxide gas is 0.8 to 2.0; or
(b) a pressure of the carbon dioxide gas is 170 kPa or more and less than 200 kPa, and a ratio of a pressure of the nitrogen gas to the pressure of the carbon dioxide gas is 1.2 to 3.5,
wherein the method does not comprise a gas-holding device, and
wherein the sparkling beverage comprises a barley malt component, a wheat malt component or a mixture of these.

* * * * *